(12) United States Patent
Nie et al.

(10) Patent No.: US 10,852,606 B2
(45) Date of Patent: Dec. 1, 2020

(54) DISPLAY PANEL CIRCUIT STRUCTURE

(71) Applicant: WUHAN CHINA STAR OPTOELECTRONICS TECHNOLOGY CO., LTD., Wuhan (CN)

(72) Inventors: Xiaohui Nie, Wuhan (CN); Jiawei Zhang, Wuhan (CN)

( * ) Notice: Subject to any disclaimer, the term of this patent is extended or adjusted under 35 U.S.C. 154(b) by 22 days.

(21) Appl. No.: 16/343,782

(22) PCT Filed: Nov. 19, 2018

(86) PCT No.: PCT/CN2018/116284
§ 371 (c)(1),
(2) Date: Apr. 22, 2019

(87) PCT Pub. No.: WO2020/087588
PCT Pub. Date: May 7, 2020

(65) Prior Publication Data
US 2020/0272006 A1    Aug. 27, 2020

(30) Foreign Application Priority Data

Oct. 29, 2018  (CN) .......................... 2018 1 1271066

(51) Int. Cl.
*G02F 1/136*    (2006.01)
*G02F 1/1362*    (2006.01)
*G02F 1/1345*    (2006.01)
*G02F 1/1368*    (2006.01)

(52) U.S. Cl.
CPC ...... *G02F 1/136286* (2013.01); *G02F 1/1368* (2013.01); *G02F 1/13452* (2013.01); *G02F 1/13458* (2013.01)

(58) Field of Classification Search
CPC .......... G02F 1/136286; G02F 1/13458; G02F 1/13452
See application file for complete search history.

(56) References Cited

U.S. PATENT DOCUMENTS

2016/0100483 A1*   4/2016   Hwang ................ H05K 1/0298
                                             313/505

* cited by examiner

*Primary Examiner* — James A Dudek

(57) ABSTRACT

In an embodiment, a display panel circuit structure includes: a display area and an output bonding area located on a side of the display area. The output bonding area includes: a plurality of first bonding pads arranged in parallel at intervals, and a plurality of first connecting lines between corresponding first bonding pads of the first bonding pads. Each of the first bonding pads includes: a first bottom pad, a first middle pad, and a first top pad. The first bottom pad and the first connecting lines are all located at a first metal layer, the first middle pad is located at a second metal layer, the first top pad is located at a transparent, electrically conductive layer, the first metal layer, the second metal layer, and the transparent, electrically conductive layer are stacked in order.

9 Claims, 8 Drawing Sheets

DISPLAY PANEL CIRCUIT STRUCTURE

CROSS REFERENCE TO RELATED APPLICATIONS

This application claims the priority of International Application No. PCT/CN2018/116284, filed on Nov. 19, 2018, which claims priority to Chinese Application No. 201811271066.9, filed on Oct. 29, 2018. The entire disclosures of the above applications are incorporated herein by reference.

FIELD OF INVENTION

The present disclosure relates to a technical field of displays, and more particularly to a display panel circuit structure.

BACKGROUND OF INVENTION

As development of display technologies develop, flat panel display devices such as liquid crystal displays (LCDs) have advantages of having high image quality, being power saving, and having thin bodies and wide application ranges. Therefore, flat panel display devices are widely used in various consumer electronic products such as mobile phones, personal digital assistants (PDAs), digital cameras, notebook computers, and desktop computers, and have become mainstreams in the display devices.

Most of LCD devices in current markets are backlight-type LCDs which include liquid crystal display panels and backlight modules. Working principles of liquid crystal display panels are that liquid crystal molecules are placed between two parallel glass substrates, many fine vertical and horizontal wires are disposed between the two glass substrates, and by causing the liquid crystal molecules to change directions based on whether being energized or not, light of a backlight module is reflected, to generate an image.

Usually, LCD panels consist of color filter (CF) substrates, thin film transistor (TFT) substrates, liquid crystals between CF substrates and TFT substrates, and sealants. Formation processes of LCD panels typically include: front-end array processes including thin film steps, yellow light steps, etching steps, and stripping steps, middle-end cell processes including steps of bonding TFT substrates and CF substrates, and back-end module processes including steps of bonding driving integrated circuits (ICs) and printed circuit boards. Front-end array processes mainly form TFT substrates, so that movements of liquid crystal molecules are controlled. Middle-end cell processes mainly add liquid crystals between CF substrates and TFT substrates. Back-end module processes mainly bond driving ICs and integrate printed circuit boards, so that liquid crystal molecules are driven to be rotated, and images are displayed.

As illustrated in FIG. 1, an existing liquid crystal display panel includes a display area 1', an output bonding (IC output pin) area 2', a test controlling (test circuit) area 3', and an output bonding (IC input pin) area 4' arranged in order. The output bonding (IC output pin) area 2' has a structure as illustrated in FIG. 2. The output bonding (IC output pin) area 2' includes a plurality of first bonding pads 30' arranged in parallel at intervals, a plurality of first connecting lines 31' between corresponding first bonding pads 30' of the first bonding pads 30', a plurality of second bonding pads 40' located between corresponding first connecting lines 31' of the first connecting lines 31' and the display area 1', a plurality of second connecting lines 32' located between corresponding first bonding pads 30' of the first bonding pads 30' and the display area 1', a plurality of third connecting lines 33' located between corresponding second bonding pads 40' of the second bonding pads 40' and the display area 1', and a plurality of fourth connecting lines 34' located between the first bonding pads 30' corresponding to the second connecting lines 32' and the test controlling area 3'. As illustrated in FIG. 3, each of the first bonding pads 30' and the second bonding pads 40' includes: a bottom pad 301', a middle pad 302' located above and electrically connected to the bottom pad 301', and a top pad 303' located above and electrically connected to the middle pad 302'. The bottom pad 301', the second connecting lines 32', and the third connecting lines 33' are all located at a first metal layer. The middle pad 302', the first connecting lines 31', and the fourth connecting lines 34' are all located at a second metal layer. The top pad 303' is located at a transparent, electrically conductive layer. An insulating interlayer 94' is disposed between the first metal layer and the second metal layer. A passivation layer 95' is disposed between the second metal layer and the transparent, electrically conductive layer. The bottom pad 301' of each of the first bonding pads 30' is electrically connected to the display area 1' using a corresponding second connecting line 32' of the second connecting lines 32'. The middle pad 302' of each of the first bonding pads 30' is electrically connected to the test controlling area 3' using a corresponding fourth connecting line 34' of the fourth connecting lines 34'. The bottom pad 301' of each of the second bonding pads 40' is electrically connected to the display area 1' using a corresponding third connecting line 33' of the third connecting lines 33'. The middle pad 302' of each of the second bonding pads 40' is electrically connected to the test controlling area 3' using a corresponding first connecting line 31' of the first connecting lines 31'.

The first bonding pads 30' and the second bonding pads 40' are all used to bond a driving chip. However, as illustrated in FIG. 4, spacing between one of the first bonding pads 30' and a first connecting line 31' of the first connecting lines 31' is small. The first connecting line 31' is only covered by the passivation layer 95' above the first connecting line 31'. During bonding, because of reasons such as poor connecting line manufacturing process, poor coverage of the passivation layer, and poor bonding process precision, the passivation layer 95' is easily broken. Therefore, the driving chip may connect the one of the first bonding pads 30' and the first connecting line 31' together, causing driving signals input to the display area 1' to be abnormal, resulting in poor display.

SUMMARY OF INVENTION

An object of the present disclosure is to provide a display panel circuit structure, to prevent a problem that when a chip is pressed any of connecting lines between corresponding bonding pads is short-circuited with any of the bonding pads corresponding to any of the connecting lines. Therefore, a process yield is improved, and product quality is ensured.

In order to achieve the aforementioned object, the present disclosure provides a display panel circuit structure including: a display area and an output bonding area located on a side of the display area;

wherein the output bonding area includes: a plurality of first bonding pads arranged in parallel at intervals, and a plurality of first connecting lines between corresponding first bonding pads of the first bonding pads;

wherein each of the first bonding pads includes: a first bottom pad, a first middle pad located above and electrically connected to the first bottom pad, and a first top pad located above and electrically connected to the first middle pad;

wherein the first bottom pad and the first connecting lines are all located at a first metal layer, the first middle pad is located at a second metal layer, the first top pad is located at a transparent, electrically conductive layer, the first metal layer, the second metal layer, and the transparent, electrically conductive layer are stacked in order, an insulating interlayer is disposed between the first metal layer and the second metal layer, and a passivation layer is disposed between the second metal layer and the transparent, electrically conductive layer;

wherein the display panel circuit structure further includes: a test controlling area located on a side of the output bonding area away from the display area, a plurality of fifth connecting lines located between corresponding first bonding pads of the first bonding pads and the test controlling area, a plurality of sixth connecting lines located between corresponding first connecting lines of the first connecting lines and the test controlling area;

wherein the fifth connecting lines and the sixth connecting lines are all located at the second metal layer;

wherein each of the fifth connecting lines has an end electrically connected to the first middle pad of a corresponding first bonding pad of the first bonding pads, and the other end electrically connected to the test controlling area; and wherein each of the sixth connecting lines has an end electrically connected to a corresponding first connecting line of the first connecting lines, and the other end electrically connected to the test controlling area.

The display panel circuit structure further includes: a plurality of second connecting lines located between corresponding first bonding pads of the first bonding pads and the display area, and the second connecting lines are located at the first metal layer;

wherein each of the second connecting lines has an end electrically connected to a first electrically conductive part of a corresponding first bonding pin of the first bonding pins, and the other end electrically connected to the display area.

The display panel circuit structure further includes: a plurality of second bonding pads located between corresponding first connecting lines of the first connecting lines andnthe display area, a plurality of third connecting lines located between the first connecting lines corresponding to the second bonding pads and corresponding second bonding pads of the second bonding pads, and a plurality of fourth connecting lines located between the second bonding pads and the display area;

wherein each of the second bonding pads includes: a second bottom pad, a second middle pad located above and electrically connected to the second bottom pad, and a second top pad located above and electrically connected to the second middle pad;

wherein the second bottom pad and the fourth connecting lines are located at the first metal layer, the second middle pad and the third connecting lines are located at the second metal layer, and the second top pad is located at the transparent, electrically conductive layer; and wherein each of the third connecting lines has an end electrically connected to a corresponding first connecting line of the first connecting lines, and the other end electrically connected to the second middle pad of a corresponding second bonding pad of the second bonding pads, each of the fourth connecting lines has an end electrically connected to the second bottom pad of a corresponding second bonding pad of the second bonding pads, and the other end electrically connected to the display area.

The test controlling area includes: a plurality of first thin film transistors, a plurality of second thin film transistors, a plurality of seventh connecting lines, a plurality of eighth connecting lines, and a signal input part;

wherein each of the first thin film transistors has a gate electrically connected to the signal input part, a source electrically connected to the other end of a corresponding fifth connecting line of the fifth connecting lines, and a drain electrically connected to an end of a corresponding seventh connecting line of the seventh connecting lines;

wherein each of the second thin film transistors has a gate electrically connected to a corresponding first thin film transistor of the first thin film transistors, a source electrically connected to the other end of a corresponding sixth connecting line of the sixth connecting lines, and a drain electrically connected to an end of a corresponding eighth connecting line of the eighth connecting lines;

wherein the other end of each of the seventh connecting lines and the other end of each of the eighth connecting lines are both electrically connected to the signal input part; and wherein the gates of the first thin film transistors, the gates of the second thin film transistors, the seventh connecting lines, and the eighth connecting lines are all located at the first metal layer, and the sources and drains of the first thin film transistors, the sources and drains of the second thin film transistors, and the signal input part are all located at the second metal layer.

The signal input part includes: a first data signal line, a second data signal line, a third data signal line, and a control signal line arranged in parallel at intervals; and wherein the gate of each of the first thin film transistors is electrically connected to the control signal line, the other end of each of the seventh connecting lines and the other end of each of the eighth connecting lines are electrically connected to corresponding data signal lines of the data signal lines, and each adjacent seventh connecting line of the seventh connecting lines and eighth connecting line of the eighth connecting lines are electrically connected to corresponding different data signal lines of the data signal lines.

The first bottom pad is electrically connected to the first middle pad using a first via extending through the insulating interlayer, and the first middle pad is electrically connected to the first top pad using a second via extending through the passivation layer.

The second bottom pad is electrically connected to the second middle pad using a third via extending through the insulating interlayer, and the second middle pad is electrically connected to the second top pad using a third via extending through the passivation layer, and each of the third connecting lines is electrically connected to the first connecting line corresponding to the end of each of the third connecting lines using a fifth via extending through the insulating interlayer.

The gate of each of the first thin film transistors is electrically connected to the signal input part using a sixth via extending through the insulating interlayer, the drain of each of the first thin film transistors is electrically connected to the seventh connecting line corresponding to the drain of each of the first thin film transistors using a seventh via extending through the insulating interlayer, each of the seventh connecting lines is electrically connected to the signal input part using an eighth via extending through the insulating interlayer, the drain of each of the second thin film transistors is electrically connected to the eighth connecting line corresponding to the drain of each of the second thin film transistors using a ninth via extending through the insulating interlayer, each of the eighth connecting lines is electrically connected to the signal input part using a tenth via extending through the insulating interlayer, and each of the sixth connecting lines is electrically connected to the first connecting line corresponding to the end of each of the sixth connecting lines using an eleventh via extending through the insulating interlayer.

An input bonding area is located on a side of the test controlling area away from the output bonding area, wherein a plurality of input bonding pads are arranged at intervals in the input bonding area.

The present disclosure has the following advantages. The present disclosure provides a display panel circuit structure including: a display area and an output bonding area located on a side of the display area. The output bonding area includes: a plurality of first bonding pads arranged in parallel at intervals, and a plurality of first connecting lines between corresponding first bonding pads of the first bonding pads. Each of the first bonding pads includes: a first bottom pad, a first middle pad located above and electrically connected to the first bottom pad, and a first top pad located above and electrically connected to the first middle pad. The first bottom pad and the first connecting lines are all located at a first metal layer, the first middle pad is located at a second metal layer, the first top pad is located at a transparent, electrically conductive layer, the first metal layer, the second metal layer, and the transparent, electrically conductive layer are stacked in order, an insulating interlayer is disposed between the first metal layer and the second metal layer, and a passivation layer is disposed between the second metal layer and the transparent, electrically conductive layer. By disposing the first connecting lines at the first metal layer, a problem that when a chip is pressed, any of the first connecting lines between the first bonding pads corresponding to any of the first connecting lines is short-circuited with any of the first bonding pads corresponding to any of the first connecting lines is prevented. Therefore, a process yield is improved, and product quality is ensured.

DESCRIPTION OF DRAWINGS

In order to further understand features and technical content of the present disclosure, please refer to the detail description and the drawings of the present disclosure below. However, the drawings are only used for reference and for illustration, and are not used to limit the present disclosure.

In the drawings.

DETAILED DESCRIPTION OF PREFERRED EMBODIMENTS

In order to further describe technical means used by the present disclosure and effects thereof, preferred embodiments of the present disclosure are described in detail below in conjunction with the drawings thereof.

Referring to FIGS. 5 to 10, the present disclosure provides a display panel circuit structure including: a display area 1 and an output bonding area 2 located on a side of the display area 1.

The output bonding area 2 includes: a plurality of first bonding pads 30 arranged in parallel at intervals, and a plurality of first connecting lines 31 between corresponding first bonding pads 30 of the first bonding pads 30.

Figure 7:
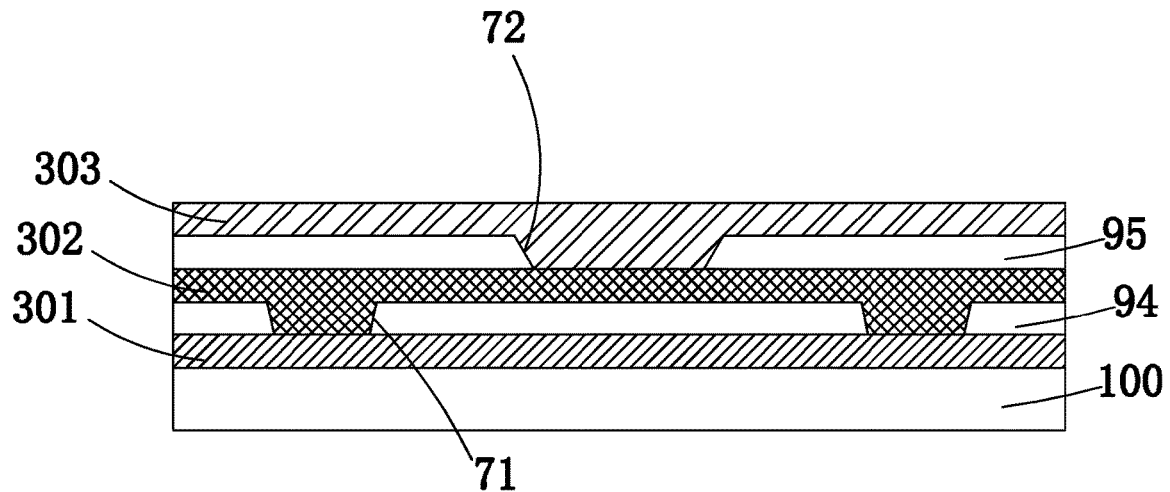
FIG. 7 is a cross-sectional diagram taken along line B-B in FIG. 5.

Referring to FIG. 7, each of the first bonding pads 30 includes: a first bottom pad 301, a first middle pad 302 located above and electrically connected to the first bottom pad 301, and a first top pad 303 located above and electrically connected to the first middle pad 302.

Figure 6:
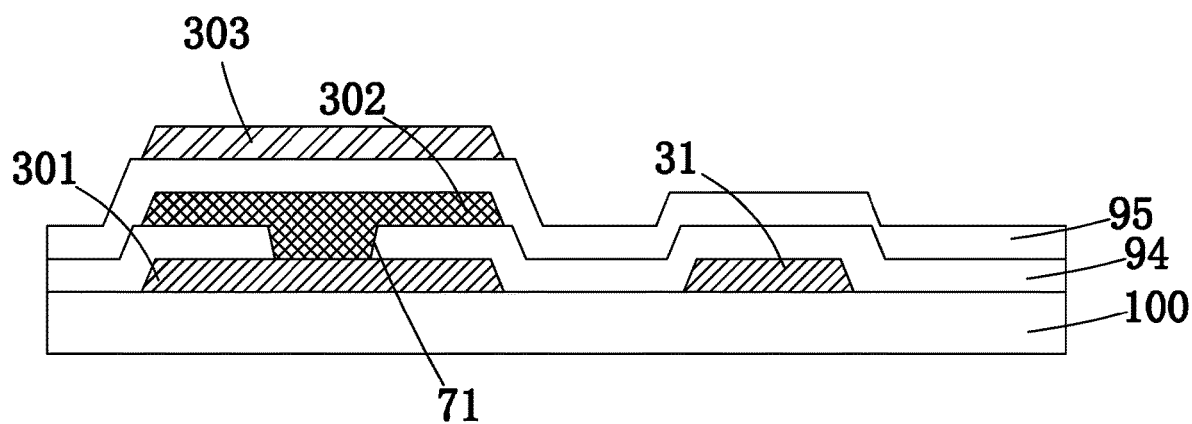
FIG. 6 is a cross-sectional diagram taken along line A-A in FIG. 5.
Figure 10:
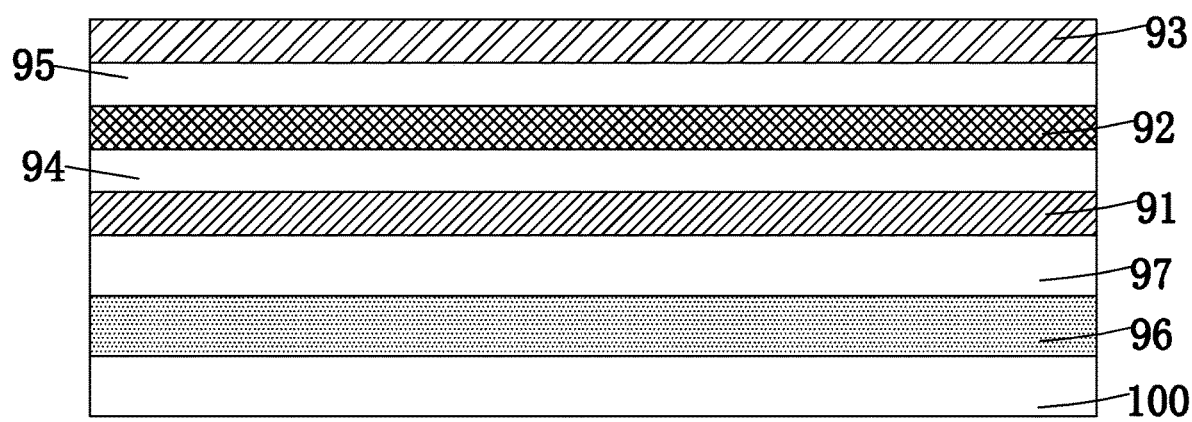
FIG. 10 is a film layer structural diagram of the display panel circuit structure of the present disclosure.

Referring FIGS. 6 and 10, the first bottom pad 301 and the first connecting lines 31 are all located at a first metal layer 91, the first middle pad 302 is located at a second metal layer 92, the first top pad 303 is located at a transparent, electrically conductive layer 93, the first metal layer 91, the second metal layer 92, and the transparent, electrically conductive layer 93 are stacked in order, an insulating interlayer 94 is disposed between the first metal layer 91 and the second metal layer 92, and a passivation layer 95 is disposed between the second metal layer 92 and the transparent, electrically conductive layer 93.

When a chip is bonded, the first connecting lines 31 located between the first bonding pads 30 corresponding to the first connecting lines 31 are located at the first metal layer 91. The first connecting lines 31 are covered by the insulating interlayer 94 and the passivation layer 95. Even if there is an error in a process, which causes the insulating interlayer 94 to be broken, the first connecting lines 31 are still covered by the passivation layer 95. Therefore, the breakage of the insulating interlayer 94 does not cause any of the first connecting lines 31 to be short-circuited with any of the first bonding pads 30 corresponding to any of the first connecting lines 31. Hence, a process yield is improved, and product quality is ensured.

Specifically, the display panel circuit structure further includes: a plurality of second connecting lines 32 located between corresponding first bonding pads 30 and the display area 1, and the second connecting lines 32 are located at the first metal layer 91.

Each of the second connecting lines 32 has an end electrically connected to a first bottom pad 301 of a corresponding first bonding pad 30 of the first bonding pads 30, and the other end electrically connected to the display area 1.

Specifically, the display panel circuit structure further includes: a plurality of second bonding pads 40 located between corresponding first connecting lines 31 of the first connecting lines 31 and the display area 1, a plurality of third connecting lines 33 located between the first connecting lines 31 corresponding to the second bonding pads 40 and corresponding second bonding pads 40 of the second bonding pads 40, and a plurality of fourth connecting lines 34 located between the second bonding pads 40 corresponding to the third connecting lines 33 and the display area 1.

Figure 8:
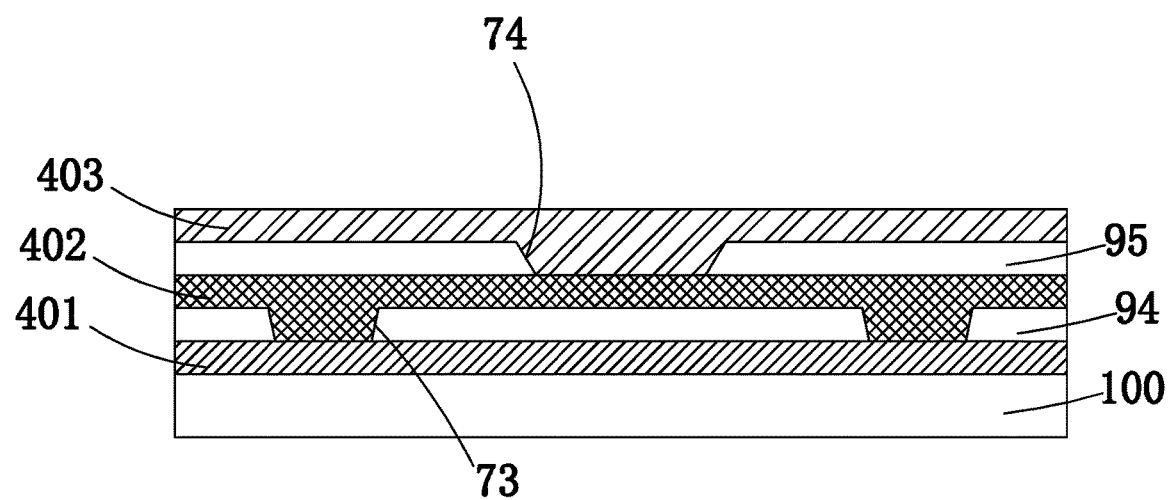
FIG. 8 is a cross-sectional diagram taken along line D-D in FIG. 5.
Figure 9:
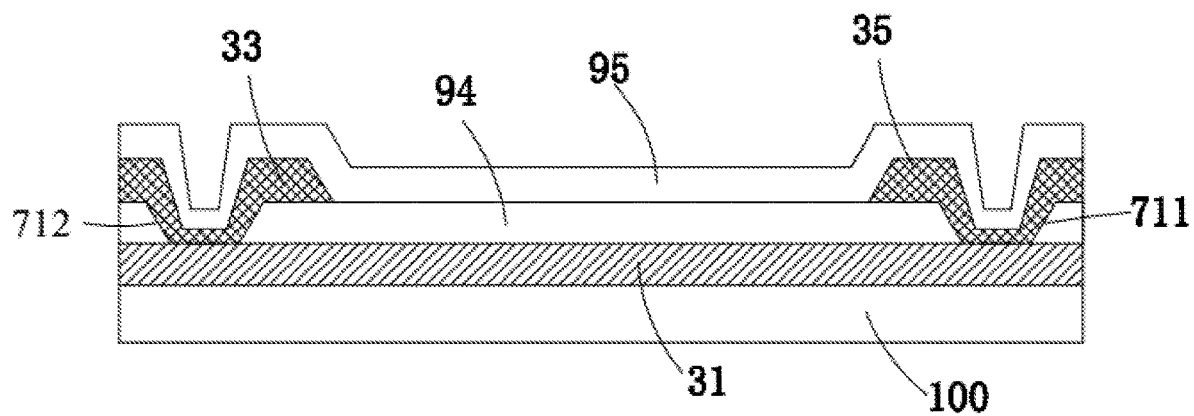
FIG. 9 is a cross-sectional diagram taken along line C-C in FIG. 5.

Referring FIGS. 8 and 9, each of the second bonding pads 40 includes: a second bottom pad 401, a second middle pad 402 located above and electrically connected to the second bottom pad 401, and a second top pad 403 located above and electrically connected to the second middle pad 402.

The second bottom pad 401 and the fourth connecting lines 34 are located at the first metal layer 91, the second middle pad 402 and the third connecting lines 33 are located at the second metal layer 92, and the second top pad 403 is located at the transparent, electrically conductive layer 93.

Each of the third connecting lines 33 has an end electrically connected to a corresponding first connecting line 31 of the first connecting lines 31, and the other end electrically connected to the second middle pad 402 of a corresponding second bonding pad 40 of the second bonding pads 40, each of the fourth connecting lines 34 has an end electrically connected to the second bottom pad 401 of a corresponding second bonding pad 40 of the second bonding pads 40, and the other end electrically connected to the display area 1.

Specifically, the display panel circuit structure further includes: a test controlling area 3 located on a side of the output bonding area 2 away from the display area 1, a plurality of fifth connecting lines 35 located between corresponding first bonding pads 30 of the first bonding pads 30 and the test controlling area 3, a plurality of sixth connecting lines 36 located between corresponding first connecting lines 31 of first connecting lines 31 and the test controlling area 3.

The fifth connecting lines 35 and the sixth connecting lines 36 are all located at the second metal layer 92.

Each of the fifth connecting lines 35 has an end electrically connected to the first middle pad 302 of a corresponding first bonding pad 30 of the first bonding pads 30, and the other end electrically connected to the test controlling area 3.

Each of the sixth connecting lines 36 has an end electrically connected to a corresponding first connecting line 31 of the first connecting lines 31, and the other end electrically connected to the test controlling area 3.

The test controlling area 3 is used to receive test signals. The output bonding area 2 is used to transmit the test signals to the display area 1. The display area 1 is used to emit light when being driven by the test signals, to complete testing images of the display panel. The test signals at least include a corresponding data signal used to drive each sub-pixel in the display area 1 to emit light.

Specifically, the test controlling area 3, the output bonding area 2, and the display area 1 are all formed on a base substrate 100. Preferably, the base substrate 100 is a glass substrate.

It should be noted that the second connecting lines 32, the first bonding pads 30, and the fifth connecting lines 35 are correspondingly connected in series in order, to form first transmission channels. The fourth connecting lines 34, the second bonding pads 40, the third connecting lines 33, the first connecting lines 31, and the sixth connecting lines 36 are correspondingly connected in series in order, to form second transmission channels. The first transmission channels and the second transmission channels are alternately arranged. Each of the first transmission channels and the second transmission channels is correspondingly connected to one column of sub-pixels in the display area 1, receives a data signal from the test controlling area 3, and transmits the data signal to corresponding sub-pixels, to lighten the corresponding sub-pixels when testing.

Specifically, the test controlling area 3 includes: a plurality of first thin film transistors 51, a plurality of second thin film transistors 52, a plurality of seventh connecting lines 37, a plurality of eighth connecting lines 38, and a signal input part 53.

Each of the first thin film transistors 51 has a gate electrically connected to the signal input part 53, a source electrically connected to the other end of a corresponding fifth connecting line 35 of the fifth connecting lines 35, and a drain electrically connected to an end of a corresponding seventh connecting line 37 of the seventh connecting lines 37.

Each of the second thin film transistors 52 has a gate electrically connected to a corresponding first thin film transistor 51 of the first thin film transistors 51, a source electrically connected to the other end of a corresponding sixth connecting line 36 of the sixth connecting lines 36, and a drain electrically connected to an end of a corresponding eighth connecting line 38 of the eighth connecting lines 38.

The other end of each of the seventh connecting lines 37 and the other end of each of the eighth connecting lines 38 are both electrically connected to the signal input part 53.

The gates of the first thin film transistors 51, the gates of the second thin film transistors 52, the seventh connecting lines 37, and the eighth connecting lines 38 are all located at the first metal layer 91, and the sources and drains of the first thin film transistors 51, the sources and drains of the second thin film transistors 52, and the signal input part 53 are all located at the second metal layer 92.

In addition, each of the first thin film transistors 51 and the second thin film transistors 52 further includes: an active layer 96 located below the gate of each of the first thin film transistors 51 and the second thin film transistors 52. There is a gate insulating layer 97 between the active layer 96 and the gate of each of the first thin film transistors 51 and the second thin film transistors 52.

The signal input part 53 includes: a first data signal line 61, a second data signal line 62, a third data signal line 63, and a control signal line 64 arranged in parallel at intervals.

The gate of each of the first thin film transistors 51 is electrically connected to the control signal line 64, the other end of each of the seventh connecting lines 37 and the other end of each of the eighth connecting lines 38 are electrically connected to corresponding data signal lines of the data signal lines, and each adjacent seventh connecting line 37 of the seventh connecting lines 37 and eighth connecting line 38 of the eighth connecting lines 38 are electrically connected to corresponding different data signal lines of the data signal lines.

Figure 1:
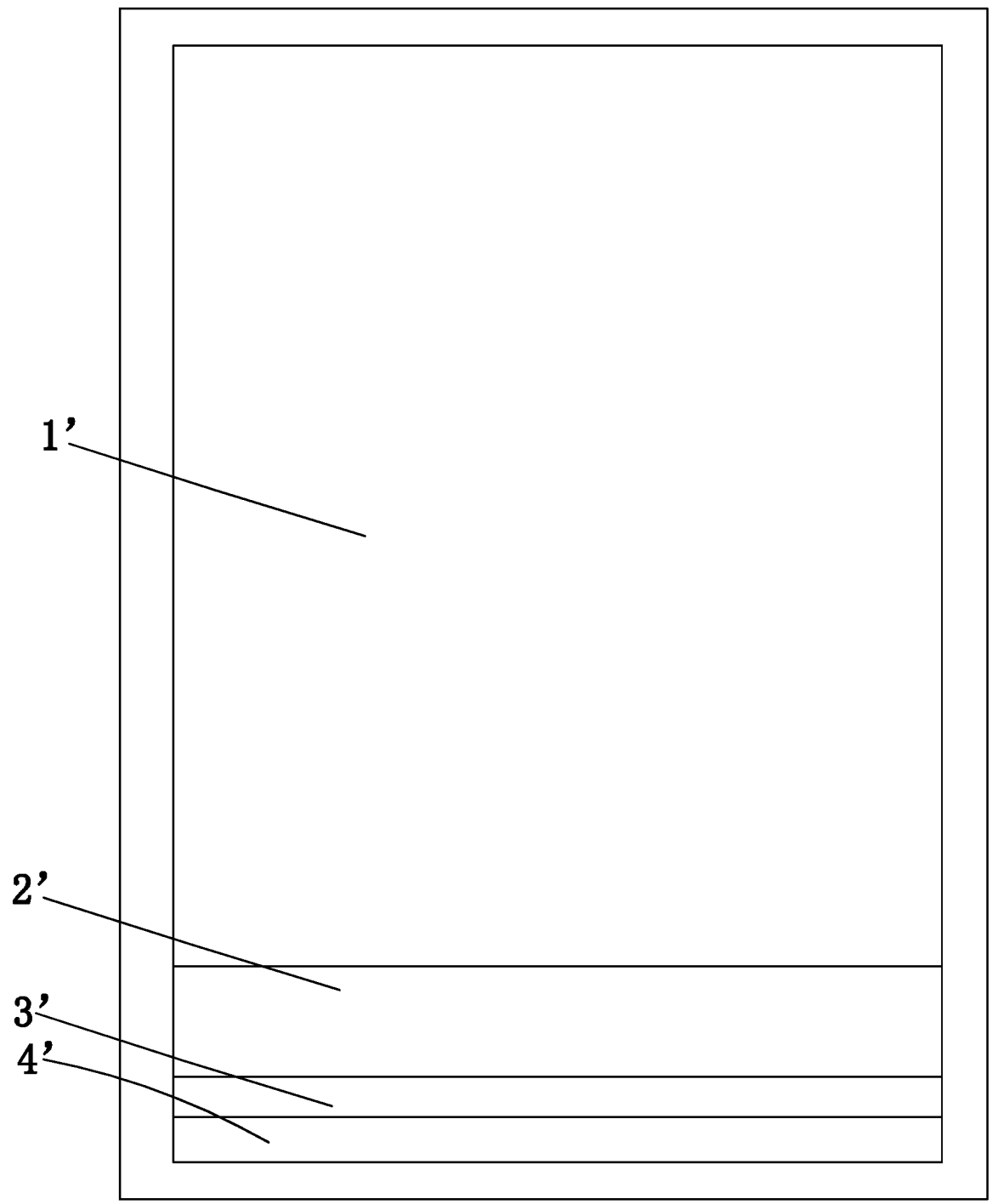
FIG. 1 is a structural diagram of an existing liquid crystal display panel.
Figure 2:
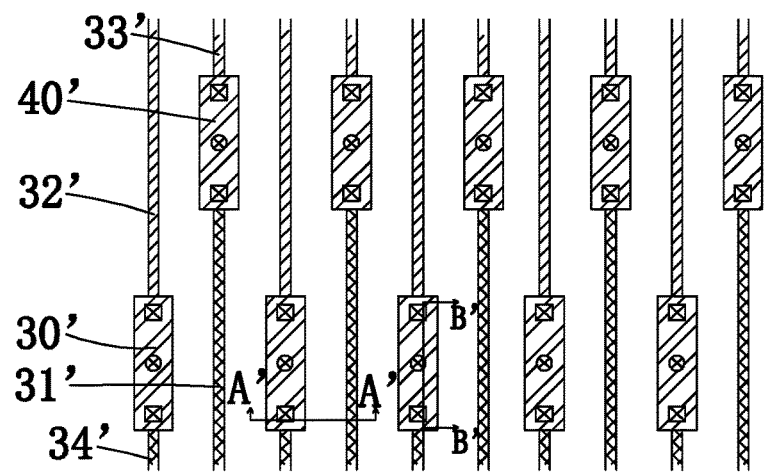
FIG. 2 is a structural diagram of an output bonding area of the existing liquid crystal display panel.
Figure 3:
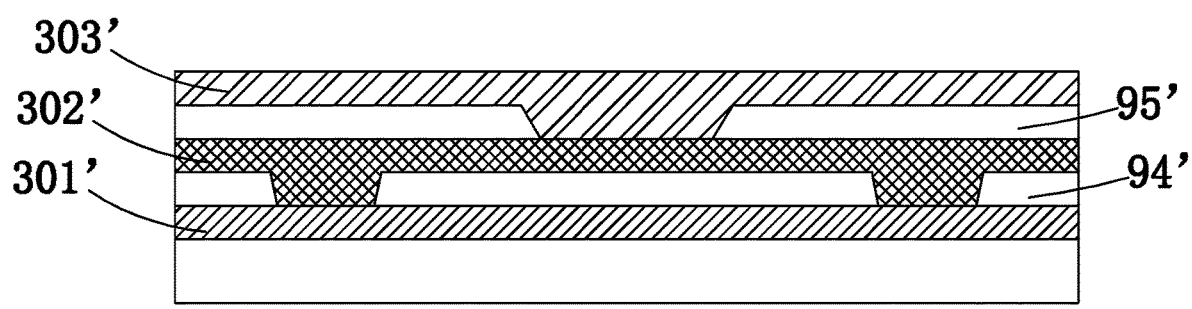
FIG. 3 is a cross-sectional diagram taken along line B'-B' in FIG. 2.
Figure 4:
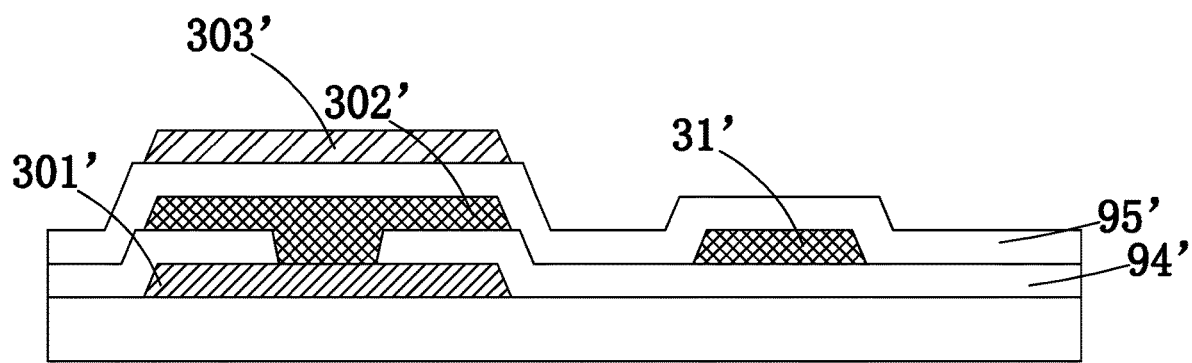
FIG. 4 is a cross-sectional diagram taken along line A'-A' in FIG. 2.
Figure 5:
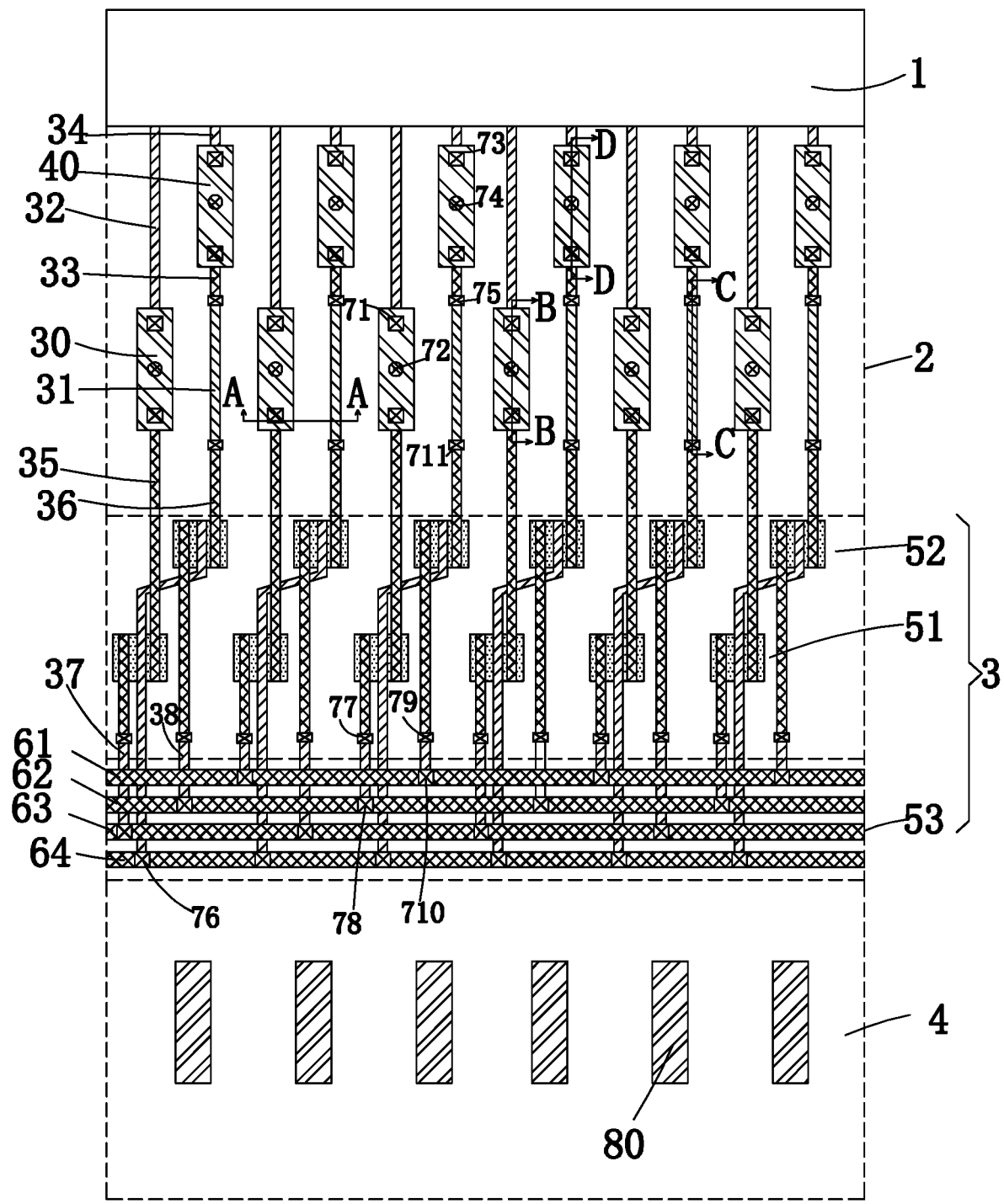
FIG. 5 is a top-view diagram of a display panel circuit structure of the present disclosure.

A specific connection relationship is, for example, illustrated in FIG. 5. The drain of the first of the first thin film transistors 51 is electrically connected to the third data signal line 63. The drain of the first of the second thin film transistors 52 is electrically connected to the second data signal line 62. The drain of the second of the first thin film transistors 52 is electrically connected to the third data signal line 63. The drain of the second of the second thin film transistors 52 is electrically connected to the third data signal line 63. The drain of the third of the first thin film transistors 51 is electrically connected to the second data signal line 62. The drain of the third of the second thin film transistors 52 is electrically connected to the first data signal line 61, and so on. The first data signal line 61, the second data signal line 62, and the third data signal line 63 are disposed corresponding to red sub-pixels, green sub-pixels, and blue sub-pixels in the display area 1, and are used to correspondingly transmit data signals of the red sub-pixels, the green sub-pixels, and the blue sub-pixels. The control signal line 64 is used to transmit control signals that cause the first thin film transistors 51 and the second thin film transistors 52 to be turned on or off.

Specifically, the first bottom pad 301 is electrically connected to the first middle pad 302 using a first via 71 extending through the insulating interlayer 94, and the first middle pad 302 is electrically connected to the first top pad 303 using a second via 72 extending through the passivation layer 95.

A connection manner between different film layers is as follows. The second bottom pad 401 is electrically connected to the second middle pad 402 using a third via 73 extending through the insulating interlayer 94, and the second middle pad 402 is electrically connected to the second top pad 403 using a third via 73 extending through the passivation layer 95, and each of the third connecting lines 33 is electrically connected to the first connecting line 31 corresponding to the end of each of the third connecting lines 33 using a fifth via 35 extending through the insulating interlayer 94.

Specifically, the gate of each of the first thin film transistors 51 is electrically connected to the signal input part 53 using a sixth via 76 extending through the insulating interlayer 94, the drain of each of the first thin film transistors 51 is electrically connected to the seventh connecting line 37 corresponding to the drain of each of the first thin film transistors 51 using a seventh via 77 extending through the insulating interlayer 94, each of the seventh connecting lines 37 is electrically connected to the signal input part 53 using an eighth via 48 extending through the insulating interlayer 94, the drain of each of the second thin film transistors 52 is electrically connected to the eighth connecting line 38 corresponding to the drain of each of the second thin film transistors 52 using a ninth via 79 extending through the insulating interlayer 94, each of the eighth connecting lines 38 is electrically connected to the signal input part 53 using a tenth via 710 extending through the insulating interlayer 94, and each of the sixth connecting lines 36 is electrically connected to the first connecting line 31 corresponding to the end of each of the sixth connecting lines 36 using an eleventh via 711 extending through the insulating interlayer 94.

It is worth mentioning that the first metal layer 91 is further used to form gates and gate lines of pixel driving thin film transistors (TFTs) in the display area 1. The second metal layer 92 is further used to form sources, drains, and source lines of the pixel driving TFTs. The transparent, electrically conductive layer 93 is further used for a pixel electrode of each sub-pixel in the display area 1.

Specifically, an input bonding area 4 is located on a side of the test controlling area 3 away from the output bonding area 2, wherein a plurality of input bonding pads 80 are arranged at intervals in the input bonding area 4.

When a light-on test is performed, a first data signal, a second data signal, and a third data signal which are external are correspondingly applied to the first data signal line 61, the second data signal line 62, and the third data signal line 63. A control signal is applied to the control signal line 64. The data signals are transmitted through the first thin film transistors 51, the second thin film transistors 52, the first transmission channels, and the second transmission channels to the display area 1, to drive the sub-pixels in the display area 1 to emit light.

When the driving chip is bonded, the driving chip has input pins bonded to the input bonding pads 80, and output pins bonded to the first bonding pads 30 and the second bonding pads 40. Therefore, external signals may be input to the driving chip through the input pins of the driving chip,
processed by the driving chip, output from the output pins of the driving chip to the first bonding pads 30 and the second bonding pads 40 afterwards, and then transmitted to the display area 1, to drive the sub-pixels in the display area 1 to emit light.

In summary, the present disclosure provides a display panel circuit structure including: a display area and an output bonding area located on a side of the display area. The output bonding area includes: a plurality of first bonding pads arranged in parallel at intervals, and a plurality of first connecting lines between corresponding first bonding pads of the first bonding pads. Each of the first bonding pads includes: a first bottom pad, a first middle pad located above and electrically connected to the first bottom pad, and a first top pad located above and electrically connected to the first middle pad. The first bottom pad and the first connecting lines are all located at a first metal layer, the first middle pad is located at a second metal layer, the first top pad is located at a transparent, electrically conductive layer, the first metal layer, the second metal layer, and the transparent, electrically conductive layer are stacked in order, an insulating interlayer is disposed between the first metal layer and the second metal layer, and a passivation layer is disposed between the second metal layer and the transparent, electrically conductive layer. By disposing the first connecting lines at the first metal layer, a problem that when a chip is pressed, any of the first connecting lines between the first bonding pads corresponding to any of the first connecting lines is short-circuited with any of the first bonding pads corresponding to any of the first connecting lines is prevented. Therefore, a process yield is improved, and product quality is ensured.

To persons skilled in the art, in accordance with the technical solutions and technical ideas of the present disclosure, various changes and modifications may be made to the description above. All these changes and modifications are within the protection scope of the claims of the present disclosure.

What is claimed is:

1. A display panel circuit structure, comprising: a display area and an output bonding area located on a side of the display area;

wherein the output bonding area comprises: a plurality of first bonding pads arranged in parallel at intervals, and a plurality of first connecting lines between corresponding first bonding pads of the first bonding pads;

wherein each of the first bonding pads comprises: a first bottom pad, a first middle pad located above and electrically connected to the first bottom pad, and a first top pad located above and electrically connected to the first middle pad;

wherein the first bottom pad and the first connecting lines are all located at a first metal layer, the first middle pad is located at a second metal layer, the first top pad is located at a transparent, electrically conductive layer, the first metal layer, the second metal layer, and the transparent, electrically conductive layer are stacked in order, an insulating interlayer is disposed between the first metal layer and the second metal layer, and a passivation layer is disposed between the second metal layer and the transparent, electrically conductive layer;

wherein the display panel circuit structure further comprises: a test controlling area located on a side of the output bonding area away from the display area, a plurality of fifth connecting lines located between corresponding first bonding pads of the first bonding pads and the test controlling area, a plurality of sixth connecting lines located between corresponding first connecting lines of the first connecting lines and the test controlling area;

wherein the fifth connecting lines and the sixth connecting lines are all located at the second metal layer;

wherein each of the fifth connecting lines has an end electrically connected to the first middle pad of a corresponding first bonding pad of the first bonding pads, and the other end electrically connected to the test controlling area; and wherein each of the sixth connecting lines has an end electrically connected to a corresponding first connecting line of the first connecting lines, and the other end electrically connected to the test controlling area.

2. The display panel circuit structure of claim 1, further comprising: a plurality of second connecting lines located between corresponding first bonding pads of the first bonding pads and the display area, and the second connecting lines are located at the first metal layer;

wherein each of the second connecting lines has an end electrically connected to the first bottom pad of a corresponding first bonding pad of the first bonding pads, and the other end electrically connected to the display area.

3. The display panel circuit structure of claim 1, further comprising: a plurality of second bonding pads located between corresponding first connecting lines of the first connecting lines and the display area, a plurality of third connecting lines located between the first connecting lines corresponding to the second bonding pads and corresponding second bonding pads of the second bonding pads, and a plurality of fourth connecting lines located between the second bonding pads corresponding to the third connecting lines and the display area;

wherein each of the second bonding pads comprises: a second bottom pad, a second middle pad located above and electrically connected to the second bottom pad, and a second top pad located above and electrically connected to the second middle pad;

wherein the second bottom pad and the fourth connecting lines are located at the first metal layer, the second middle pad and the third connecting lines are located at the second metal layer, and the second top pad is located at the transparent, electrically conductive layer; and wherein each of the third connecting lines has an end electrically connected to a corresponding first connecting line of the first connecting lines, and the other end electrically connected to the second middle pad of a corresponding second bonding pad of the second bonding pads, each of the fourth connecting lines has an end electrically connected to the second bottom pad of a corresponding second bonding pad of the second bonding pads, and the other end electrically connected to the display area.

4. The display panel circuit structure of claim 1, wherein the test controlling area comprises: a plurality of first thin film transistors, a plurality of second thin film transistors, a plurality of seventh connecting lines, a plurality of eighth connecting lines, and a signal input part;

wherein each of the first thin film transistors has a gate electrically connected to the signal input part, a source electrically connected to the other end of a corresponding fifth connecting line of the fifth connecting lines, and a drain electrically connected to an end of a corresponding seventh connecting line of the seventh connecting lines;

wherein each of the second thin film transistors has a gate electrically connected to a corresponding first thin film transistor of the first thin film transistors, a source electrically connected to the other end of a corresponding sixth connecting line of the sixth connecting lines, and a drain electrically connected to an end of a corresponding eighth connecting line of the eighth connecting lines;

wherein the other end of each of the seventh connecting lines and the other end of each of the eighth connecting lines are both electrically connected to the signal input part; and wherein the gates of the first thin film transistors, the gates of the second thin film transistors, the seventh connecting lines, and the eighth connecting lines are all located at the first metal layer, and the sources and drains of the first thin film transistors, the sources and drains of the second thin film transistors, and the signal input part are all located at the second metal layer.

5. The display panel circuit structure of claim 4, wherein the signal input part comprises: a first data signal line, a second data signal line, a third data signal line, and a control signal line arranged in parallel at intervals; and wherein the gate of each of the first thin film transistors is electrically connected to the control signal line, the other end of each of the seventh connecting lines and the other end of each of the eighth connecting lines are electrically connected to corresponding data signal lines of the data signal lines, and each adjacent seventh connecting line of the seventh connecting lines and eighth connecting line of the eighth connecting lines are electrically connected to corresponding different data signal lines of the data signal lines.

6. The display panel circuit structure of claim 1, wherein the first bottom pad is electrically connected to the first middle pad using a first via extending through the insulating interlayer, and the first middle pad is electrically connected to the first top pad using a second via extending through the passivation layer.

7. The display panel circuit structure of claim 3, wherein the second bottom pad is electrically connected to the second middle pad using a third via extending through the insulating interlayer, and the second middle pad is electrically connected to the second top pad using a fourth via extending through the passivation layer, and each of the third connecting lines is electrically connected to the first connecting line corresponding to the end of each of the third connecting lines using a fifth via extending through the insulating interlayer.

8. The display panel circuit structure of claim 4, wherein the gate of each of the first thin film transistors is electrically connected to the signal input part using a sixth via extending through the insulating interlayer, the drain of each of the first thin film transistors is electrically connected to the seventh connecting line corresponding to the drain of each of the first thin film transistors using a seventh via extending through the insulating interlayer, each of the seventh connecting lines is electrically connected to the signal input part using an eighth via extending through the insulating interlayer, the drain of each of the second thin film transistors is electrically connected to the eighth connecting line of the corresponding to the drain of each of the second thin film transistors using a ninth via extending through the insulating interlayer, each of the eighth connecting lines is electrically connected to the signal input part using a tenth via extending through the insulating interlayer, and each of the sixth connecting lines is electrically connected to the first connecting line corresponding to the end of each of the sixth connecting lines using an eleventh via extending through the insulating interlayer.

9. The display panel circuit structure of claim 1, further comprising: an input bonding area located on a side of the test controlling area away from the output bonding area, wherein a plurality of input bonding pads are arranged at intervals in the input bonding area.

\* \* \* \* \*